United States Patent
Peng

(10) Patent No.: US 7,126,833 B2
(45) Date of Patent: Oct. 24, 2006

(54) AUXILIARY QUASI-RESONANT DC TANK ELECTRICAL POWER CONVERTER

(75) Inventor: Fang Z. Peng, Okemos, MI (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 11/173,341

(22) Filed: Jul. 1, 2005

(65) Prior Publication Data

US 2006/0109694 A1 May 25, 2006

Related U.S. Application Data

(60) Provisional application No. 60/630,840, filed on Nov. 24, 2004.

(51) Int. Cl.
H02M 7/5387 (2006.01)
H02M 7/537 (2006.01)
H02M 1/06 (2006.01)

(52) U.S. Cl. .................. 363/132; 363/131; 363/138

(58) Field of Classification Search ............. 363/132, 363/131, 138, 137, 139, 51, 40, 109
See application file for complete search history.

(56) References Cited

U.S. PATENT DOCUMENTS

| | | | |
|---|---|---|---|
| 2,942,153 A * | 6/1960 | Schultze et al. ............... 361/17 |
| 3,867,643 A | 2/1975 | Baker et al. |
| 4,833,584 A * | 5/1989 | Divan ........................... 363/37 |
| 4,864,483 A | 9/1989 | Divan |
| 5,047,913 A | 9/1991 | DeDoncker et al. |
| 5,172,309 A | 12/1992 | DeDoncker et al. |
| 5,280,421 A | 1/1994 | DeDoncker et al. |
| 5,559,685 A | 9/1996 | Lauw et al. |
| 5,572,418 A | 11/1996 | Kimura et al. |
| 5,574,636 A | 11/1996 | Lee et al. |
| 5,594,634 A | 1/1997 | Rajashekara et al. |
| 5,710,698 A | 1/1998 | Lai et al. |
| 5,892,673 A * | 4/1999 | Delgado et al. ............... 363/98 |
| 5,949,669 A * | 9/1999 | Bruckmann et al. ......... 363/132 |
| 6,091,615 A * | 7/2000 | Inoshita et al. ............... 363/98 |
| 6,111,770 A * | 8/2000 | Peng ........................... 363/131 |
| 6,205,040 B1 * | 3/2001 | Teichmann .................. 363/57 |
| 6,307,760 B1 | 10/2001 | Ikimi |

(Continued)

OTHER PUBLICATIONS

F.Z. Peng and D.J. Adams, "An Auxiliary Quasi-Resonant Tank Soft-Switching Inverter," IEEE Ind. Appl. Conf. Record, 2000, pp. 2397-2403, vol. 4.

Primary Examiner—Karl Easthom
Assistant Examiner—Harry R Behm
(74) Attorney, Agent, or Firm—Kirk A. Wilson

(57) ABSTRACT

An auxiliary quasi-resonant dc tank (AQRDCT) power converter with fast current charging, voltage balancing (or charging), and voltage clamping circuits is provided for achieving soft-switched power conversion. The present invention is an improvement of the invention taught in U.S. Pat. No. 6,111,770, herein incorporated by reference. The present invention provides faster current charging to the resonant inductor, thus minimizing delay time of the pulse width modulation (PWM) due to the soft-switching process. The new AQRDCT converter includes three tank capacitors or power supplies to achieve the faster current charging and minimize the soft-switching time delay. The new AQRDCT converter further includes a voltage balancing circuit to charge and discharge the three tank capacitors so that additional isolated power supplies from the utility line are not needed. A voltage clamping circuit is also included for clamping voltage surge due to the reverse recovery of diodes.

4 Claims, 8 Drawing Sheets

U.S. PATENT DOCUMENTS

| | | |
|---|---|---|
| 6,384,564 B1 | 5/2002 | Pollock |
| 6,570,370 B1 | 5/2003 | Tupper et al. |
| 6,643,157 B1 | 11/2003 | Furukawa et al. |
| 6,956,755 B1 * | 10/2005 | Nielsen ................. 363/132 |
| 6,995,994 B1 * | 2/2006 | Bijlenga et al. ............ 363/51 |

* cited by examiner

ARCP Phase Leg (prior art)

Delta-Configured RSI (prior art)

Resonant Snubber Inverter Phase Leg

Zero-Voltage Transition Inverter (prior art)

ACRDCL Inverter (prior art)

AQRDCL Inverter (prior art)

ARDCT circuit of U.S. Patent 6,111,770 (prior art)

Waveforms of ARDCT Generating a Zero-Voltage Interval for the Main Devices to Switch (prior art)

Waveforms and Control Timing of Fig. 10
Generating a Zero-Voltage Interval for the Main Devices to Switch

AUXILIARY QUASI-RESONANT DC TANK ELECTRICAL POWER CONVERTER

CROSS-REFERENCE TO RELATED APPLICATIONS

This application claims priority to U.S. Provisional Patent Application 60/630,840 filed Nov. 24, 2004, and is related to U.S. Pat. No. 6,111,770, issued Aug. 29, 2000, both herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

FIELD OF THE INVENTION

This invention relates to soft-switching converters, and more particularly to an auxiliary quasi-resonant dc tank based converter to achieve soft and essentially lossless switching for power conversion.

BACKGROUND OF THE INVENTION

Soft switching technique has been used in power converters to reduce switching losses and alleviate electromagnetic interference (EMI). At present, there are two main topologies of soft switching inverters, resonant dc link and resonant snubber. The active clamped resonant dc link (ACRDCL) converter in U.S. Pat. No. 4,864,483 of Divan et al, issued Sep. 5, 1989, the auxiliary quasi-resonant dc link (AQRDCL) converter in U.S. Pat. No. 5,172,309 of De Donker, issued Dec. 15, 1992, and the voltage clamped parallel resonant (VCPR) converter in U.S. Pat. No. 5,559,685 of Lauw, issued Sep. 24, 1996, are examples of resonant dc link inverters. They are hereby incorporated by reference. Auxiliary resonant snubber inverters (in other words, the auxiliary resonant commutated pole (ARCP) or resonant snubber inverters (RSI)), represented in U.S. Pat. No. 5,047,913 of De Donker et al, issued Sep. 10, 1991, U.S. Pat. No. 5,710,698 of Lai et al, issued Jan. 20, 1998, U.S. Pat. No. 5,572,418 of Kimura et al, issued Nov. 5, 1996, and U.S. Pat. No. 5,574,636 of Lee et al, issued Nov. 12, 1996, belong to the second category, resonant snubber inverters.

The resonant snubber inverters (FIGS. 1–4) employ two resonant capacitors and one resonant inductor for each phase leg to achieve soft switching. In spite of their advantages of lower EMI, dv/dt, and switching losses, these soft switching inverters have common problems compared to the resonant link inverters and traditional hard-switching inverters: (1) excessive number of additional active and passive components; (2) high current stress on the main switching devices, and (3) poor reliability. Accordingly, soft switching technology is expected to be used for medium or high power (>100 kW) applications and special load/environment requirements, such as EMI-sensitive equipment, etc.

The resonant link inverters have advantages over the resonant snubber inverters in terms of less component count and low cost. In the ACRDCL converter (FIG. 5), a resonant circuit, incorporated with an active clamping switch and clamping capacitor, is used as an interface between a dc power supply and the dc bus of an inverter. The ACRDCL resonates periodically, bringing the dc bus voltage to zero once each resonant cycle. The inverter switching devices are switched on and off at zero voltage instants of the resonant dc link, thus achieving lossless switching. However, the ACRDCL converter has some disadvantages, such as, high voltage stress across the inverter switches and continuous resonant operation of the dc link. To overcome the disadvantages of the ACRDCL converter, the auxiliary quasi-resonant dc link (AQRDCL, FIG. 6) converter has been developed. The AQRDCL converter is employed to achieve soft-switching in an inverter coupled to a dc power supply via a resonant dc link circuit. The resonant dc link circuit includes a clamping switch limiting the dc bus voltage across the inverter to the positive rail voltage of the dc supply and auxiliary switching device(s) assisting resonant operation of the resonant bus to zero voltage in order to provide a zero-voltage switching opportunity for the inverter switching devices as the inverter changes state. The AQRDCT converter embraces its own problems such as high current stress because the clamping switch Sc and diode Dc (FIG. 6) have to carry the full dc current, although it does not have the high voltage stress problem of the ACRDCL. The VCPR converter (FIG. 7) was developed to reduce the current stress of the link switches (Sc1 and Sc2). However, the dc current that delivers dc power to the inverter has to still flow partly through the switches and partially through the resonant inductor (LR).

Despite their advantages and advances, the ACRDCL converter, the AQRDCL converter, and the VCPR converter have the following common disadvantages: (1) The resonant dc link circuit acts as an interface (i.e., a dc-to-dc converter) between the dc power supply and the inverter and needs to transmit power and to carry dc current from the dc power supply to the inverter or from the inverter back to the dc power supply via switch(es) and/or resonant component(s), which can lead to significant power losses; (2) The voltage clamping, voltage control, and charge balancing become difficult due to the dc power transmission; (3) The current stress on the auxiliary switch(es), clamping switch(es), and resonant inductor is high (at least as high as that on the inverter main switches); and (4) Two resonant dc link circuits are needed for an ac-to-dc-to-ac converter/inverter system to implement soft-switching at both ac-to-dc power conversion stage and dc-to-ac power conversion stage.

BRIEF DESCRIPTION OF THE INVENTION

An auxiliary quasi-resonant DC tank (AQRDCT) power converter with fast current charging, voltage balancing (or charging), and voltage clamping circuits is provided for achieving soft-switched power conversion. The present invention is an improvement of the invention taught in U.S. Pat. No. 6,111,770, herein incorporated by reference. The present invention provides faster current charging to the resonant inductor, thus minimizing delay time of the pulse width modulation (PWM) due to the soft-switching process. The new AQRDCT converter includes three tank capacitors or power supplies to achieve the faster current charging and minimize the soft-switching time delay. The new AQRDCT converter further includes a voltage balancing circuit to charge and discharge the three tank capacitors so that additional isolated power supplies from the utility line are not needed. A voltage clamping circuit is also included for clamping voltage surge due to the reverse recovery of diodes.

DETAILED DESCRIPTION OF THE INVENTION

Figure 1:
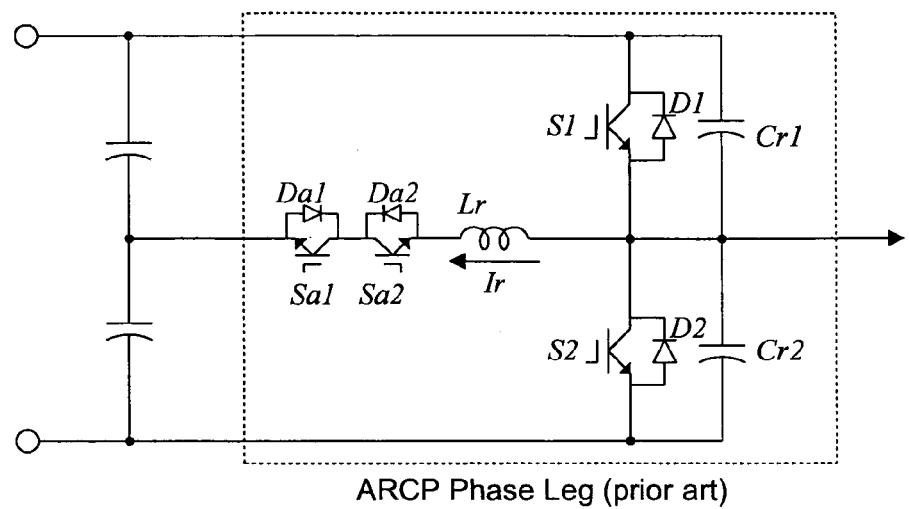
FIG. 1 shows an auxiliary resonant commutated pole (ARCP) circuit. (prior art)
Figure 2:
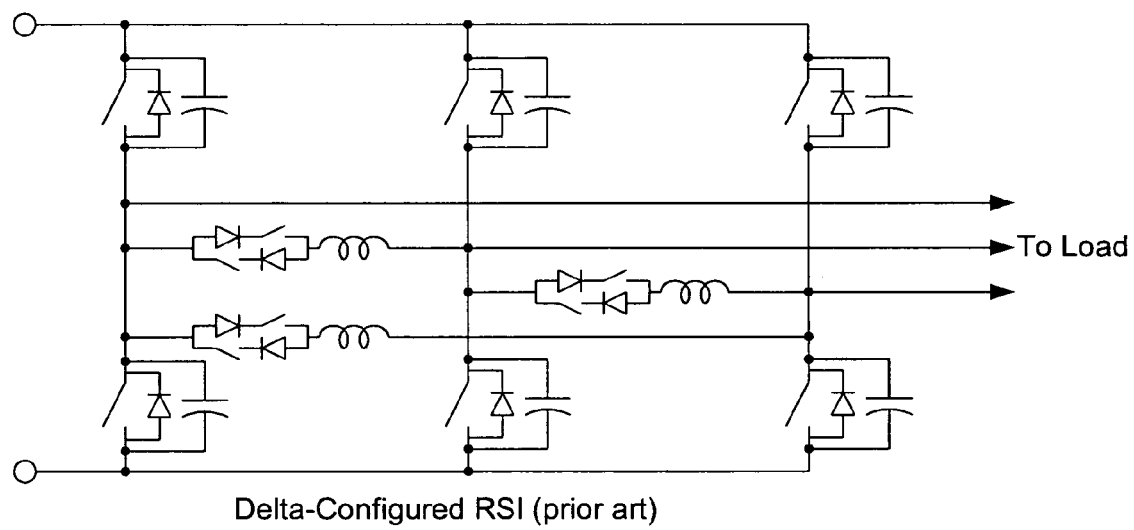
FIG. 2 shows a delta configured resonant snubber inverter (RSI) circuit. (prior art)
Figure 3:
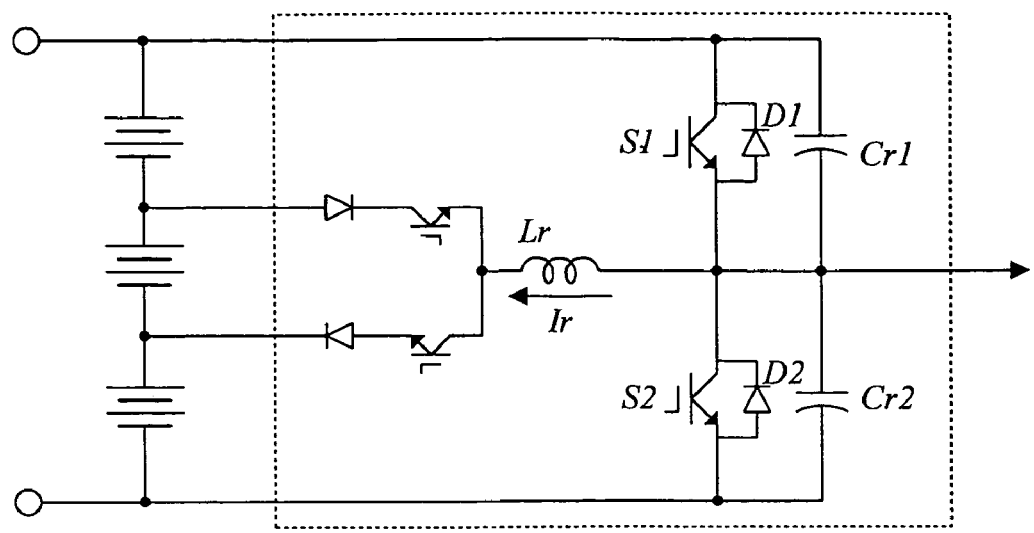
FIG. 3 shows a resonant snubber inverter phase leg circuit. (prior art)
Figure 4:
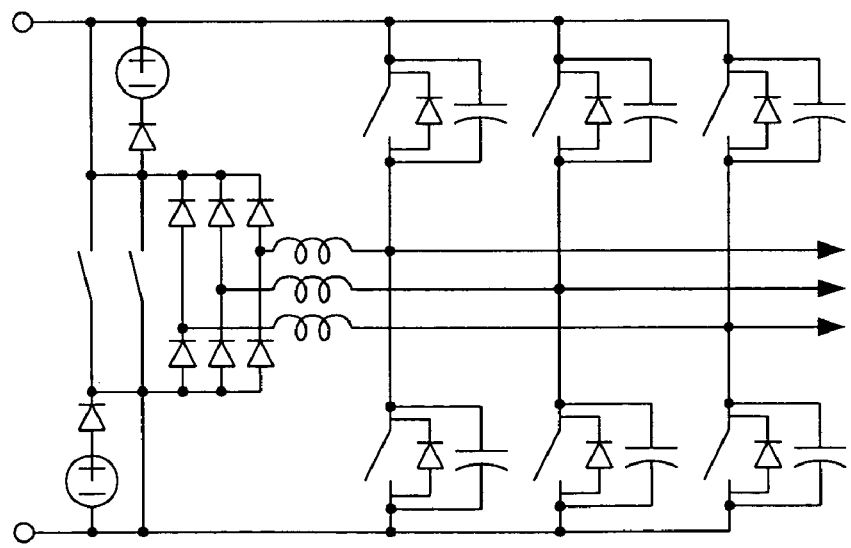
FIG. 4 shows a zero-voltage transition inverter circuit. (prior art)
Figure 5:
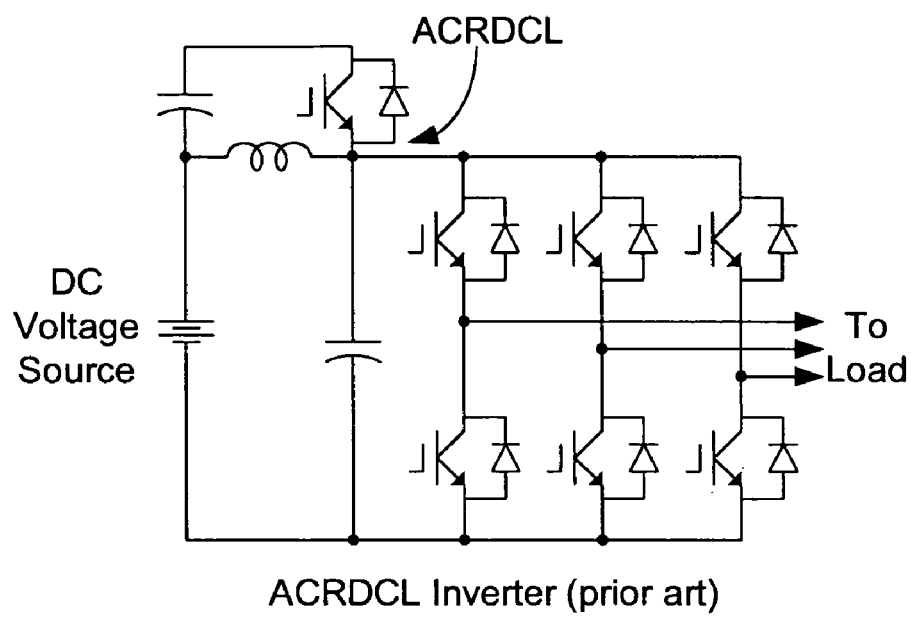
FIG. 5 shows an ACRDCL inverter circuit. (prior art)
Figure 6:
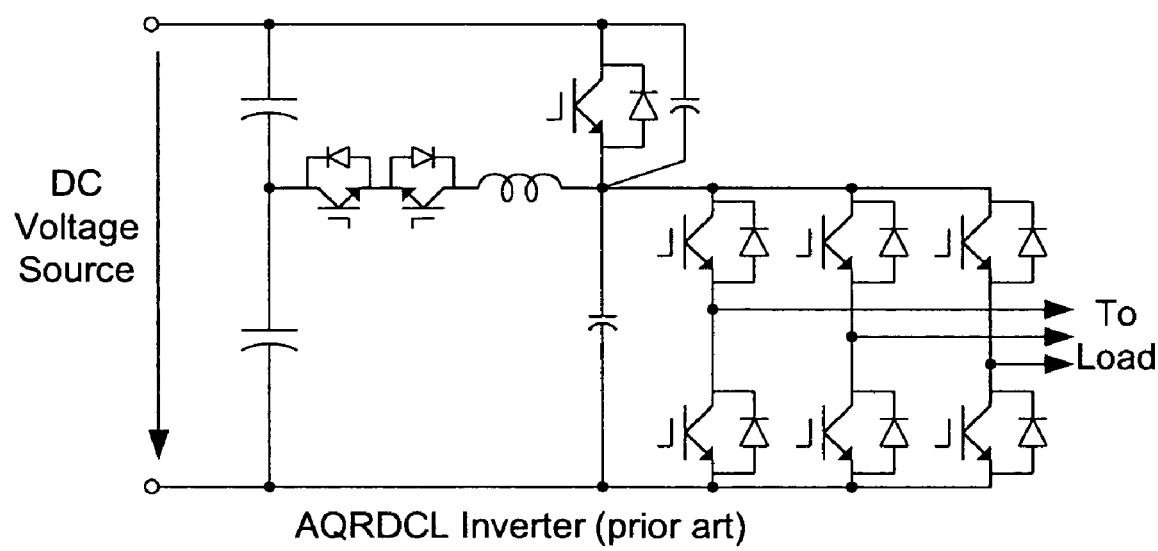
FIG. 6 shows an auxiliary quasi-resonant DC link inverter circuit. (prior art)
Figure 7:
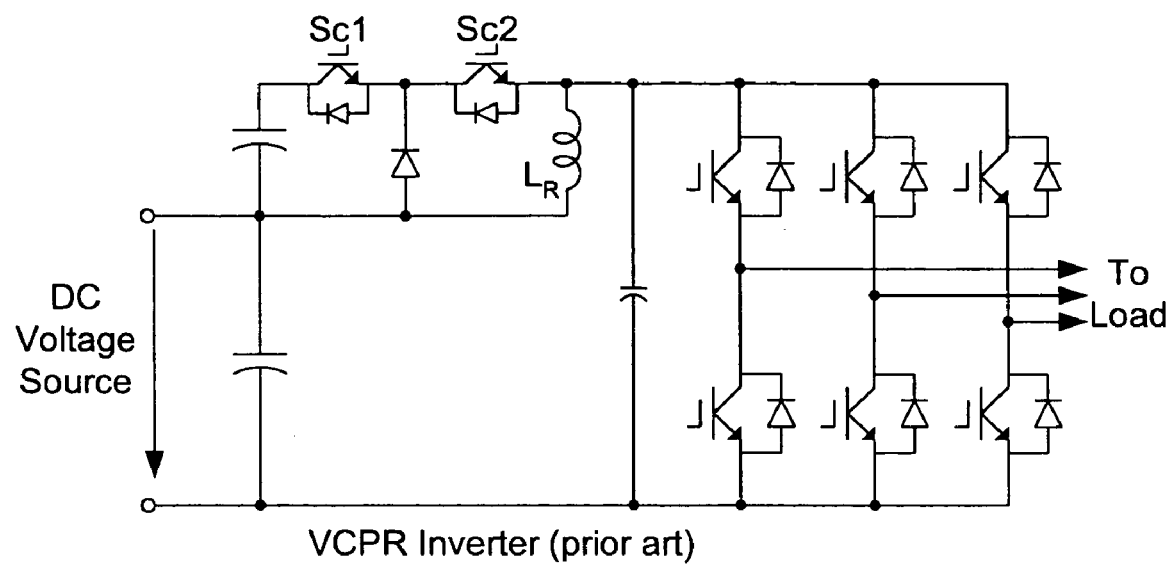
FIG. 7 shows a VCPR circuit. (prior art)
Figure 8:
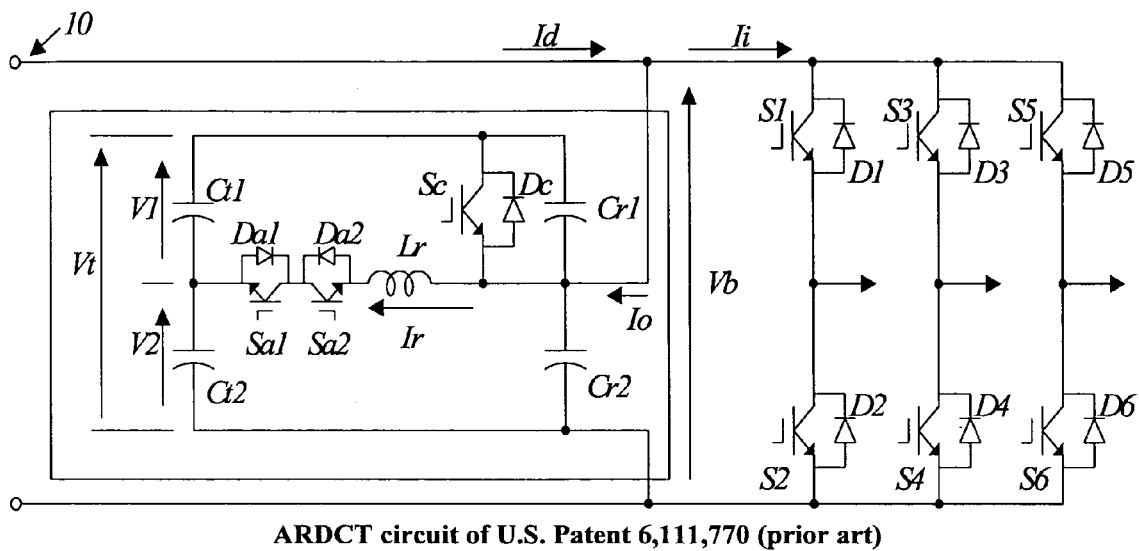
FIG. 8 shows an embodiment of the auxiliary resonant DC tank inverter (ARDCT) circuit. (prior art)

An auxiliary quasi-resonant dc tank (AQRDCT) circuit is taught as an improvement of U.S. Pat. No. 6,111,770 as shown in FIG. 8. The AQRDCT is employed to provide a quasi-resonant or resonant dc bus across the converter without transmitting real power and carrying dc current. Moreover, such an AQRDCT circuit has no problems of voltage clamping and balancing and is capable of providing opportunity for soft-switching at both ac-to-dc power conversion stage and dc-to-ac conversion stage of an ac-to-ac converter, thus making the converter circuit more compact and efficient. In addition, the AQRDCT inverter has minimum component count and minimum changes to the traditional hard-switching inverters.

The AQRDCT inverter provides a novel alternative to the existing soft-switching topologies, has been proven of concept in a 10 kW prototype, and has been put into practical use in electric bus drives (100 kW). The AQRDCT inverter includes an auxiliary resonant tank circuit which provides a quasi-resonant dc bus across the inverter without transmitting or carrying load power and carrying dc current, and has less current and voltage stresses on the switches. The AQRDCT circuit is an add-on part to the traditional PWM inverters and will not affect the normal PWM operation of the inverter. This feature makes the ART inverter much more reliable than today's soft-switching inverters. Moreover, the AQRDCT inverter has no problems of voltage clamping and balancing, thus making control simpler. Experimental results demonstrate tremendous reduction of EMI, dv/dt, and switching losses. The AQRDCT inverter is a promising alternative that can alleviate the problems of today's soft-switching inverters.

Figure 9:
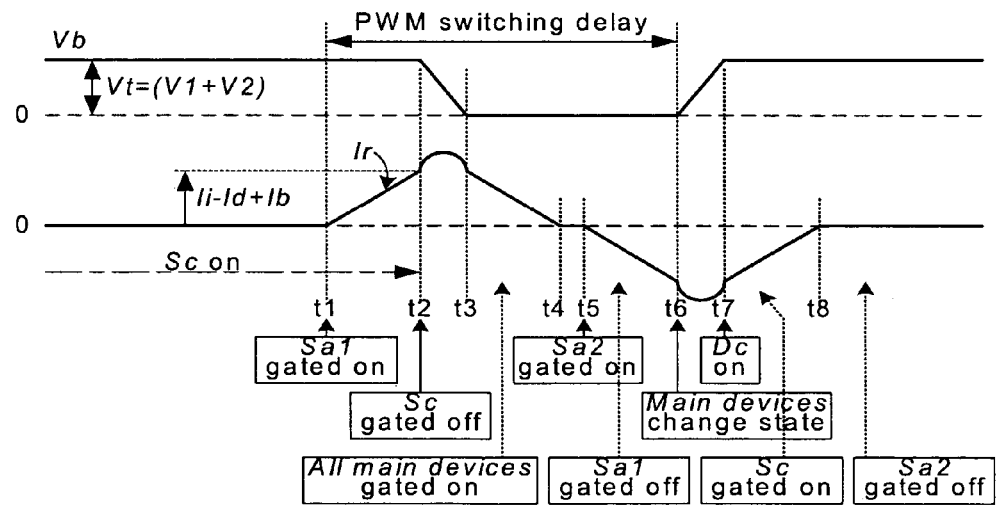
FIG. 9 shows the waveforms of the ARDCT circuit in FIG. 8. (prior art)

An advantage of this invention is a AQRDCT circuit that shortens charging time of the resonant inductor, thus delay time of PWM operation can be minimized. A soft-switching process (t1–t8 in FIG. 9) can take 5 to 10 microseconds to complete, which affects the normal PWM operation of the inverter and causes time delay of PWM operation. The most undesired time consuming process is charging the resonant inductor. In FIG. 9, t1–t2 and t5–t6 are the positive and negative charging intervals of the resonant inductor, respectively. Time t3–t4 and t7–t8 are the positive and negative discharging intervals of the resonant inductor, respectively. Time t2–t3 and t6–t7 are the intervals for the voltage to change, usually the slower the better in order to reduce dV/dt. In order to minimize the time delay caused by a soft-switching process, it is desirable to shorten the charging time of the inductor.

Moreover, in order to ensure that the inverter bus voltage Vb resonates from the dc tank voltage (Vt) to zero and from zero back to Vt, the resonant inductor has to be charged to a pre-determined level before gating off the clamping switch Scl and changing switching state of the main inverter. This pre-determined current level is dependent on the resonant circuit losses (compensated by lb), dc supply current ld, and inverter dc bus current li, which is difficult to detect. As a result, the control is complicated and difficult to implement because of time-variant load current and uncertainty of the losses. Therefore, another advantage of the present invention is to provide a modified AQRDCT circuit that does not require a pre-determined resonant current level for the bus voltage Vb to resonate from the dc tank voltage (Vt) to zero and from zero back to Vt.

In addition, another advantage of the present invention is to provide a modified AQRDCT circuit that can charge and balance the dc tank capacitors.

Yet another advantage of the present invention is to provide voltage clamping for the auxiliary switches due to reverse recovery and noise related mal-gating.

Figure 10:
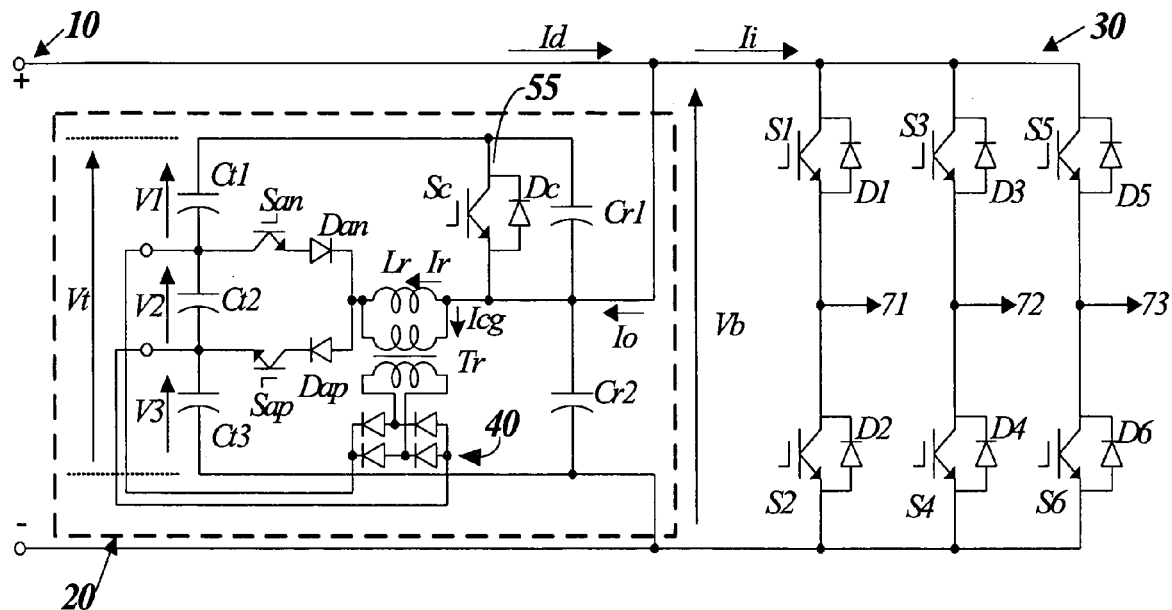
FIG. 10 shows a preferred embodiment of the AQRDCT circuit.

FIG. 10 shows a preferred embodiment of the present invention. The AQRDCT 20 is connected in parallel across the dc bus of the dc power supply 10 that directly feeds the main inverter 30. The AQRDCT includes three tank capacitors, Ct1, Ct2, and Ct3, to provide three voltage levels V1, V2, and V3, a resonant inductor Lr, a first auxiliary resonant switch Sap and diode Dap to provide positive resonant current through the resonant inductor Lr, a second auxiliary resonant switch San and diode Dan to provide negative resonant current through the resonant inductor Lr, a charge circuit to provide three stable voltage levels V1, V2 and V3, a first clamping means 55 having switch Sc and a clamping diode Dc to clamp the bus voltage Vb to the tank voltage Vt, a pair of resonant capacitors Cr1 and Cr2. The charge circuit 40 consists of a transformer Tr coupled across the resonant inductor Lr, feeding a diode bridge that charges the tank capacitor Ct2. The main inverter 30, as an example in the figure, is a three-phase bridge consisting of 6 main switches S1–S6 and 6 anti-parallel diodes D1–D6.

Figure 11:
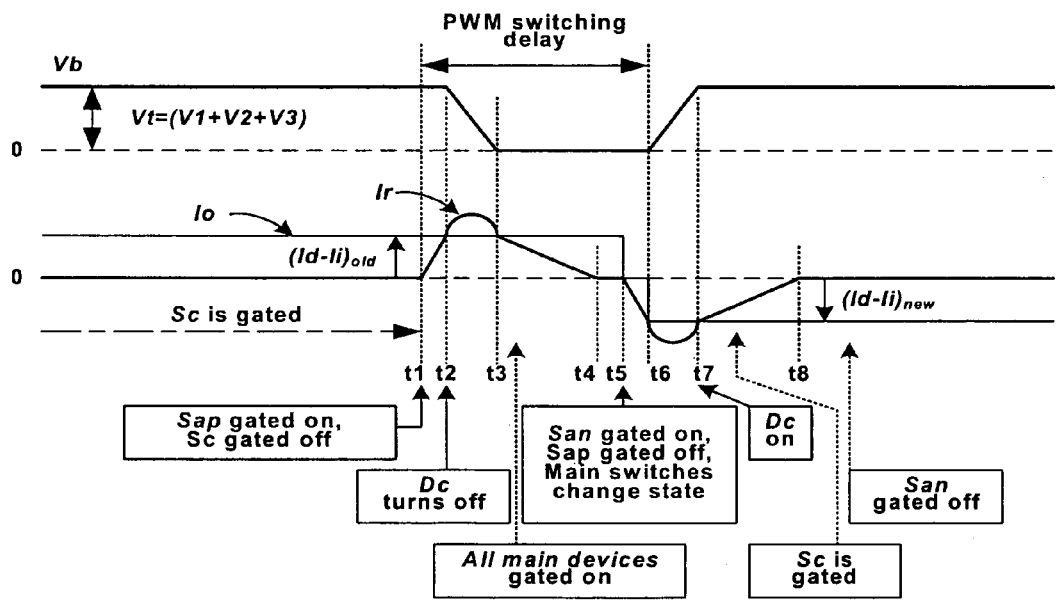
FIG. 11 shows the waveforms of the AQRDCT circuit in FIG. 10.

FIG. 11 shows example waveforms and control timing during a switching transient. Compared with the original AQRDCT inverter (FIG. 8 and its waveforms and control timing FIG. 9), the control is much simpler. The waveforms and control sequence can be explained as follows.

Before t1, the clamping switch Sc is already gated on, whether Sc or Dc carries the current it depends on the direction of the resonant tank current lo (lo=ld−li). In FIG. 11, it is assumed that the tank current lo is positive Dc is conducting. At t1, when the main inverter desires to switch, Sc is gated off and Sap is gated on at the same time. Sc is zero-voltage turnoff and Sap is zero-current turnon. The resonant current Ir through the resonant inductor Lr increases linearly and rapidly since voltage V1+V2 is applied across the inductor during t1–t2. At t2, Ir reaches the resonant tank current Io and the clamping diode Dc's current becomes zero, i.e. Dc turns off. From t2 to t3, a resonant circuit forms via Cr1, Cr2, Lr, Dap, and Sap. The tank capacitors Ct1, Ct2, and Ct3 are much larger than Cr1 and Cr2. As results, V1, V2, and V3 are assumed constant during the switching transient (t1–t8). The resonant current Ir charges Cr1 and discharges Cr2. The bus voltage Vb decreases to zero at t3. When the resonant current Ir attempts to negatively charge the capacitor Cr2, the diodes of the main inverter phase legs, D1 and D2, D3 and D4, and D5 and D6 clamps the voltage to zero. Right after t3 (Vb reaches zero), all main devices are gated on to clamp the zero voltage level. The resonant current decreases linearly and slowly since only V3 is applied to the inductor. At t4, the resonant current reaches zero and stay zero till t5 when San is gated on and all main switches change to the desired state at zero voltage. At this time, the inverter dc current Ii step-changes to a new level due to the main devices' switching. If (Id−Ii)<0, the main diodes D1–D6 take over the main switches' clamping function. As a result, the resonant tank current Io becomes to zero. The resonant current Ir through the resonant inductor Lr starts negatively charging and increases linearly and rapidly since voltage V2+V3 is applied negatively across the inductor. At t6, Ir reaches the new current level (Id−Ii) and the main diodes (D1–D6)' clamping ends. From t6 to t7, a resonant circuit forms via Cr1, Cr2, Lr, Dan, and San. The resonant current Ir charges Cr2 and discharges Cr1. The bus voltage Vb increases to the tank voltage Vt at t7. When the resonant current Ir attempts to over charge the capacitor Cr2 and to negatively charge Cr1, the clamping diode Dc clamps the voltage Vb to Vt. Right after t7, Sc is gated on at zero voltage and zero current. The resonant current Ir decreases linearly and slowly because V1 is applied across the inductor. At t8, Ir reaches zero and San is gated off right after t8 at zero-current turnoff. A switching cycle completes.

In FIG. 11, the charging current waveform is not shown. During t1–t8, there are two charging intervals, t1–t2 and t5–t6. During t1–t2, voltage (V1+V2) is applied to the primary of the transformer Tr, inducing a voltage (V1+V2)*(n2/n1) on the secondary which charges Ct2 through the diode bridge 40. Similarly during t5–t6, voltage (V2+V3) is applied to the primary of the transformer Tr, inducing a voltage (V2+V3)*(n2/n1) on the secondary which charges Ct2 through the diode bridge 40. The secondary-over-primary turns ration of the transformer Tr, (n2/n1), is designed so that a desired V2 can be obtained. The desired voltage level, V2, is dependent on the resonant circuit losses, desired charging rate of the resonant current Ir, etc. A preferred voltage level of V2 is 10~30% of the tank voltage Vt. An equal voltage level for V1 and V3 is desirable. As results, the charging circuit can be designed so that V1=V3=45~35% of Vt and V2=10~30% of Vt.

Figure 12:
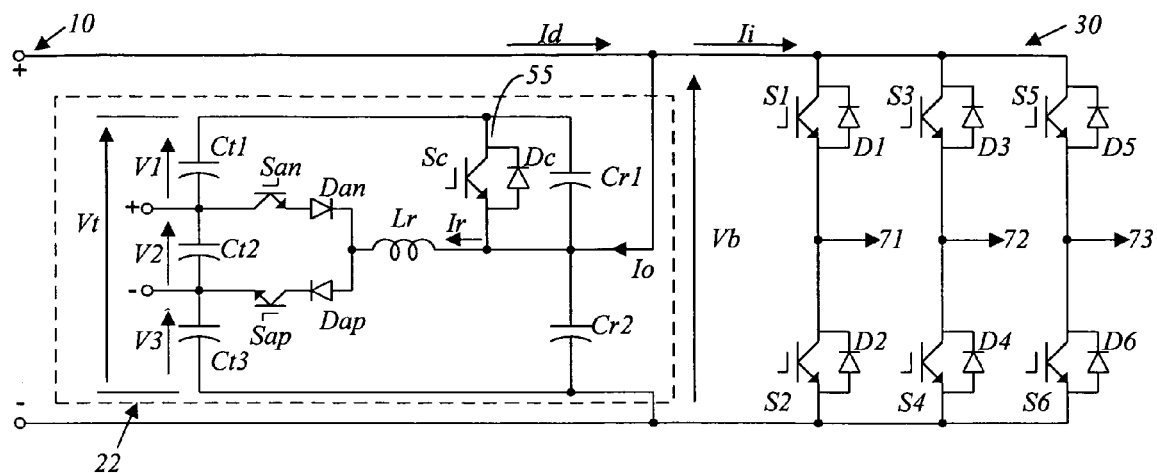
FIG. 12 shows another embodiment of the AQRDCT circuit with the charging circuit omitted.

FIG. 12 shows another embodiment of the present invention, where the charging circuit of Ct2 is omitted. In this case, an outside dc power supply is needed to maintain Ct2's voltage level V2.

Figure 13:
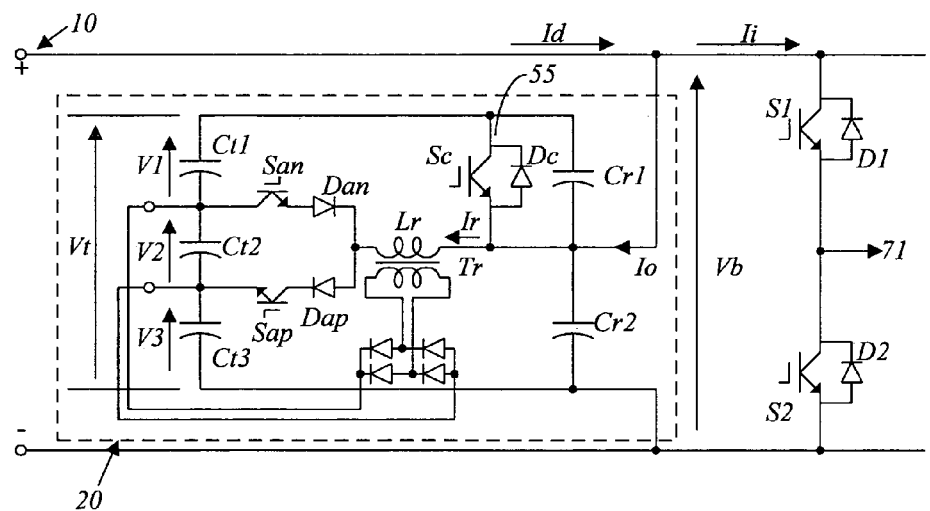
FIG. 13 shows another embodiment of the present invention, in which the resonant inductor is omitted.

FIG. 13 shows another embodiment of the present invention, in which the resonant inductor is omitted. The primary of the transformer Tr is employed as the resonant inductance so that the transformer serves as dual purposes.

Figure 14:
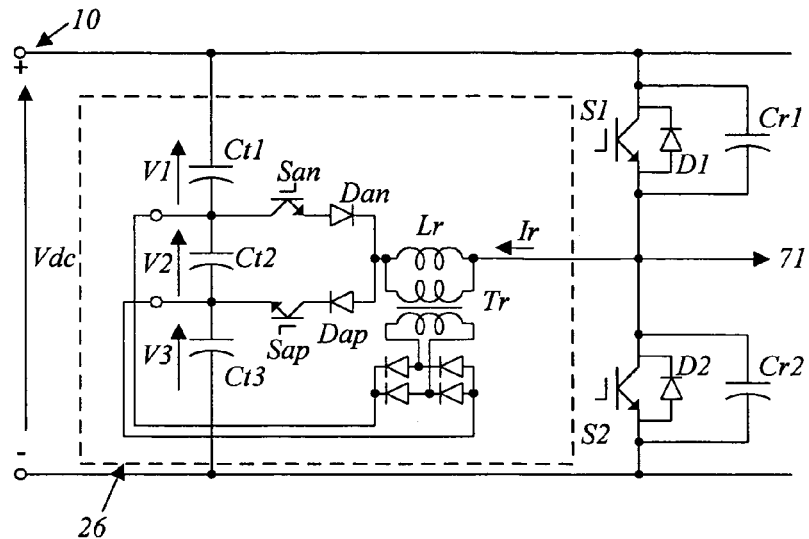
FIG. 14 shows another embodiment of the present invention, where an AQRDCT circuit is directly applied to a main inverter phase leg to provide soft-switching transition to the phase leg.

FIG. 14 shows another embodiment of the present invention, where an AQRDCT circuit is directly applied to a main inverter phase leg to provide soft-switching transition to the phase leg.

Figure 15:
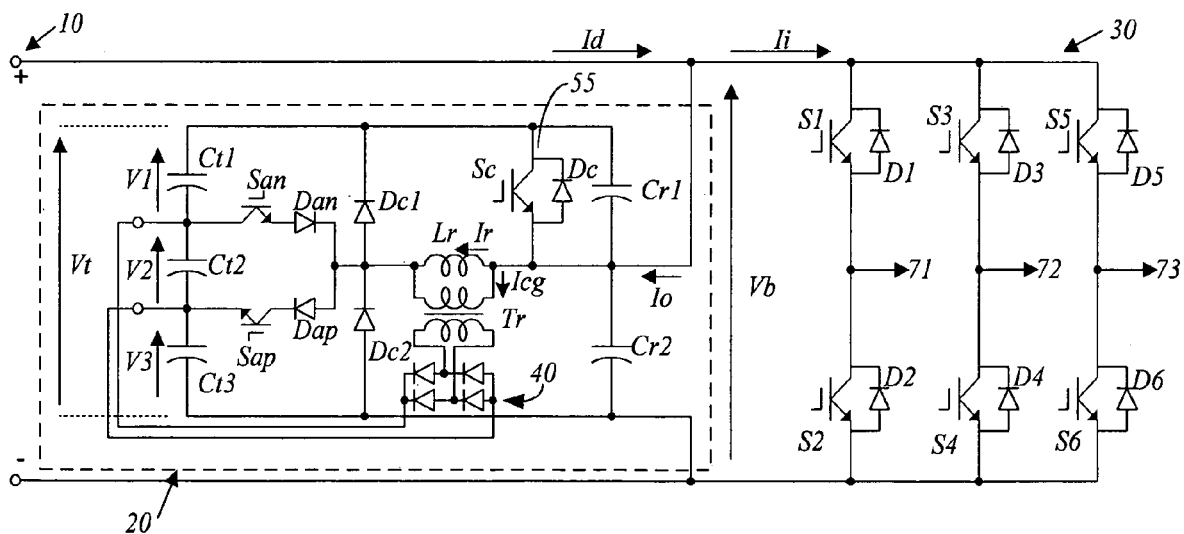
FIG. 15 shows a preferred clamping circuit of the present invention.

In FIGS. 10, and 12–14, the auxiliary switches Sap and San are gated off at zero current. However, in real applications, a voltage surge may occur due to the auxiliary diodes (Dan and Dan)'s reverse recovery or noise-related malgating or mistiming. FIG. 15 shows a preferred clamping circuit of the present invention, applied to FIG. 10 to clamp such voltage surges. The diodes Dc1 and Dc2 clamp the voltage to the dc tank so that the voltage across the auxiliary switches Sap and San never exceed the tank voltage Vt. Similarly, this clamping circuit can be applied to all other inverter circuits.

While there has been shown and described what are at present considered the preferred embodiments of the invention, it will be obvious to those skilled in the art that various changes and modifications can be made therein without departing from the scope.

I claim:

1. An auxiliary quasi-resonant dc tank converter, comprising:
    an ac power supply and an ac bus;
    a dc power supply for providing dc current to a dc bus;
    an inverter having at least one phase leg connected to said ac bus and connected across said dc bus, said inverter having at least one main switching device per phase leg;
    a quasi-resonant dc tank circuit coupled in parallel with said dc power supply for generating a quasi-resonant voltage across said dc bus, said quasi-resonant dc tank circuit including,
        an upper resonant capacitor and a lower resonant capacitor connected in series as a resonant leg,
        a first dc tank capacitor, a second dc tank capacitor, and a third dc tank capacitor connected in series as a tank leg,
        an auxiliary quasi-resonant circuit coupled across the junction of said upper and lower resonant capacitors, the junction of said first and second dc tank capacitors and the junction of said second and third dc tank capacitors, said lower resonant capacitor being coupled across said dc bus, said resonant leg being coupled across said tank leg, and
        a first clamping means coupled across said upper resonant capacitor,
    said auxiliary quasi-resonant dc tank converter further comprising a charge circuit coupled across the junction of said first and second dc tank capacitors and the junction of said second and third dc tank capacitors,
    wherein said charge circuit further comprises a transformer coupled across said resonant inductor feeding a diode bridge to charge said second tank capacitor.

2. The auxiliary quasi-resonant dc tank converter of claim 1 wherein the primary of said transformer provides resonant inductance to the circuit.

3. An auxiliary quasi-resonant dc tank converter, comprising:
    an ac power supply and an ac bus; a dc power supply for providing dc current to a dc bus;
    an inverter having at least one phase leg connected to said ac bus and connected across said dc bus, said inverter having at least one main switching device per phase leg;

a quasi-resonant dc tank circuit coupled in parallel with said dc power supply for generating a quasi-resonant voltage across said dc bus, said quasi-resonant dc tank circuit including,
    an upper resonant capacitor and a lower resonant capacitor connected in series as a resonant leg,
    a first dc tank capacitor, a second dc tank capacitor, and a third dc tank capacitor connected in series as a tank leg,
    an auxiliary quasi-resonant circuit coupled across the junction of said upper and lower resonant capacitors, the junction of said first and second dc tank capacitors and the junction of said second and third dc tank capacitors, said lower resonant capacitor being coupled across said dc bus, said resonant leg being coupled across said tank leg,
    a first clamping means coupled across said upper resonant capacitor,
said converter further comprising a charge circuit coupled across the junction of said first and second dc tank capacitors and the junction of said second and third dc tank capacitors,
wherein said charge circuit further comprises an outside dc power supply to maintain voltage in said second tank capacitor.

4. An auxiliary quasi-resonant dc tank converter, comprising:
an ac power supply and an ac bus;
a dc power supply for providing dc current to a dc bus;
an inverter having at least one phase leg connected to said ac bus and connected across said dc bus, said inverter having at least one main switching device per phase leg;
a quasi-resonant dc tank circuit coupled in parallel with said dc power supply for generating a quasi-resonant voltage across said dc bus, said quasi-resonant dc tank circuit including,
    an upper resonant capacitor and a lower resonant capacitor connected in series as a resonant leg,
    a first dc tank capacitor, a second dc tank capacitor, and a third dc tank capacitor connected in series as a tank leg,
    an auxiliary quasi-resonant circuit coupled across the junction of said upper and lower resonant capacitors, the junction of said first and second dc tank capacitors and the junction of said second and third dc tank capacitors, said lower resonant capacitor being coupled across said dc bus, said resonant leg being coupled across said tank leg, and
    a first clamping means coupled across said upper resonant capacitor,
wherein each phase leg of said inverter has its own resonant dc tank circuit and is connected to each other through magnetic coupling, and further the tank leg of the quasi-resonant dc tank circuit of each phase leg is coupled to each other.

* * * * *